(12) United States Patent
Hamamura (10) Patent No.: US 11,474,762 B2
(45) Date of Patent: Oct. 18, 2022

(54) PRINTING SYSTEM AND MANAGING METHOD FOR PRINTING SYSTEM

(71) Applicant: MIMAKI ENGINEERING CO., LTD., Nagano (JP)

(72) Inventor: Satoshi Hamamura, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 446 days.

(21) Appl. No.: 16/593,958

(22) Filed: Oct. 4, 2019

(65) Prior Publication Data
US 2020/0114667 A1   Apr. 16, 2020

(30) Foreign Application Priority Data
Oct. 11, 2018   (JP) .............................. JP2018-192824

(51) Int. Cl.
*G06F 3/12* (2006.01)
*H04N 1/00* (2006.01)
(Continued)

(52) U.S. Cl.
CPC .......... *G06F 3/1254* (2013.01); *G06F 3/1202* (2013.01); *H04N 1/00344* (2013.01); *H04N 1/2346* (2013.01); *H04N 1/32609* (2013.01); *H04N 1/32625* (2013.01); *B41J 2/165* (2013.01); *B41J 3/4078* (2013.01); *G05B 19/0428* (2013.01); *G05B 23/0256* (2013.01); *G05B 2219/2646* (2013.01); *G06F 3/121* (2013.01); *H04N 1/00928* (2013.01)

(58) Field of Classification Search
None
See application file for complete search history.

(56) References Cited

U.S. PATENT DOCUMENTS

| 8,446,608 | B2* | 5/2013 | Matsui | ............... | H04N 1/00002 358/1.14 |
| 2003/0071862 | A1* | 4/2003 | Tsukada | ............... | B41J 2/17523 347/7 |

(Continued)

FOREIGN PATENT DOCUMENTS

| JP | 2004287673 | 10/2004 |
| JP | 2011079250 | 4/2011 |

(Continued)

OTHER PUBLICATIONS

JP-2011-180771 English Translation, par 0036-0039 (Year: 2011).*
"Office Action of Japan Counterpart Application" with English translation thereof, dated Apr. 19, 2022, p. 1-p. 13.

*Primary Examiner* — Miya J Williams
(74) *Attorney, Agent, or Firm* — JCIPRNET (57) ABSTRACT

A printing system that performs printing includes a printing apparatus in which at least a part thereof is configured by a unit part which is a replaceable function component. The printing apparatus is controlled using a command group including a printer control command which is a command for controlling the printing apparatus and a unit inspection command which is a command used for an inspection of the unit part. At least a part of the printing apparatus is configured by a plurality of unit parts having different functions. The plurality of unit parts are configured to be inspected using the unit inspection command.

8 Claims, 3 Drawing Sheets

(51) Int. Cl.
*H04N 1/32* (2006.01)
*H04N 1/23* (2006.01)
*G05B 23/02* (2006.01)
*B41J 2/165* (2006.01)
*G05B 19/042* (2006.01)
*B41J 3/407* (2006.01)

(56) References Cited

U.S. PATENT DOCUMENTS

| | | | | |
|---|---|---|---|---|
| 2014/0270812 | A1* | 9/2014 | Scrafford | G03G 15/5079 |
| | | | | 399/12 |
| 2017/0185878 | A1* | 6/2017 | Matsuo | H04N 1/00267 |
| 2019/0227475 | A1* | 7/2019 | Tachibana | G03G 15/556 |
| 2019/0366740 | A1* | 12/2019 | Watanabe | B41J 11/20 |
| 2021/0303942 | A1* | 9/2021 | Watanabe | B41J 13/009 |

FOREIGN PATENT DOCUMENTS

| | | | |
|---|---|---|---|
| JP | 2011180771 A | * | 9/2011 |
| JP | 2017201736 | | 11/2017 |
| JP | 2018065307 | | 4/2018 |

* cited by examiner

PRINTING SYSTEM AND MANAGING METHOD FOR PRINTING SYSTEM

CROSS REFERENCE TO RELATED APPLICATIONS

This application claims the priority benefit of Japanese Patent Application No. 2018-192824, filed on Oct. 11, 2018. The entirety of the above-mentioned patent application is hereby incorporated by reference herein and made a part of this specification.

TECHNICAL FIELD

The present disclosure relates to a printing system and a managing method for the printing system.

DESCRIPTION OF THE BACKGROUND ART

Conventionally, an inkjet printer, which is a printing apparatus that performs printing through an inkjet method, has been widely used (see e.g., Japanese Unexamined Patent Publication No. 2018-065307 (Patent Literature 1)). Furthermore, in recent years, with the spread of applications of the printing apparatus such as the inkjet printer, it is required to further improve the maintainability of the printing apparatus.

Patent Literature 1: Japanese Unexamined Patent Publication No. 2018-065307

SUMMARY

In order to realize the configuration of the printing apparatus having high maintainability, for example, it is conceivable to manufacture the printing apparatus using replaceable unit parts modularized in functional units. In such a configuration, for example, replacement can be performed in units of unit parts, and thus even if a failure occurs in the printing apparatus, for example, repair can be performed more easily and appropriately by replacing the unit part.

However, in this case, it is usually necessary to confirm that the unit parts are normal or the like before incorporating each unit part in the printing apparatus. Furthermore, for example, when manufacturing a printing apparatus using a plurality of unit parts having different functions from one another, an inspection or the like for confirming the function is required for each unit part. In this case, the man hours for inspecting each unit part are increased, which may increase the management trouble and the like in the printing system using the printing apparatus. Therefore, conventionally, regarding a printing system using a printing apparatus, it has been desired to provide a printing system that can be more easily managed. The present disclosure thus provides a printing system and a managing method for the printing system capable of solving the problems described above.

The inventor of the present application intensively studied the method for constructing a printing system that can be more easily managed. Then, as a method therefor, the inventor, for example, considered reducing the man hours for inspecting each unit part by sharing the manner of inspecting the unit part to some extent in a printing apparatus (e.g., inkjet printer) manufactured using a plurality of unit parts having different functions from one another.

More specifically, the inventor of the present application first considered performing a control using a printer control command, which is a command created using a predetermined software development kit (SDK) with respect to the printing apparatus. Then, the inventor considered creating a unit inspection command which is a command used for inspection of the unit part using the same SDK. In this case, the man hours for inspecting each unit part can be appropriately reduced by obtaining a configuration in which inspection can be performed using the unit inspection command for each unit part.

Furthermore, the inventor of the present application found the features necessary for obtaining such effects through further intensive research, and have contrived the present disclosure. In order to solve the above problems, the present disclosure provides a printing system that performs printing, the printing system including a printing apparatus in which at least a part thereof is configured by a unit part which is a replaceable function component. The printing apparatus is controlled using a command group including a printer control command which is a command for controlling the printing apparatus and a unit inspection command which is a command used for inspection of the unit part. At least a part of the printing apparatus is configured by a plurality of unit parts having different functions. The plurality of unit parts are configured to be inspected using the unit inspection command.

With this configuration, for example, inspection can be easily and appropriately performed on a plurality of unit parts. Moreover, for example, the man hours for inspecting each unit part can be appropriately reduced. Therefore, with this configuration, for example, even when the printing system includes a printing apparatus manufactured using a plurality of unit parts having different functions, the printing system can be managed more easily and appropriately.

Further, in this configuration, for example, each of the plurality of unit parts is inspected using the unit inspection command before being incorporated into the printing apparatus. According to such a configuration, for example, a printing apparatus can be appropriately manufactured using the unit parts.

Further, in this configuration, the command group can be considered as, for example, a group including a plurality of commands created using a common development environment. More specifically, the command group can be considered as, for example, a group including a plurality of commands created using a software development kit (SDK) based on a same specification. Furthermore, more specifically, as such a command group, for example, a group including a plurality of commands created using the MDL command SDK distributed by MIMAKI ENGINEERING CO., LTD. can be suitably used.

In addition, in this configuration, the printing system may further include a controller. In this case, the controller controls another device by outputting at least one of the commands included in the command group. Furthermore, when the inspection on the unit part is to be performed, for example, the controller outputs the unit inspection command to the unit part. According to such a configuration, the inspection of the unit part can be appropriately performed. As the controller, for example, it is conceivable to use a device different from the printing apparatus. Furthermore, for example, the printing apparatus may also have the function of the controller.

Furthermore, in this configuration, it is conceivable to use, as the unit part, for example, a component having a processing unit that performs processes based on the received unit inspection command. In this case, it is conceivable to use, for example, a substrate on which an electronic component is mounted as the processing unit. Furthermore, for example, a component that is configured to execute a self-test can be suitably used as the unit part. In this case, it is conceivable to use a command group including the unit inspection command that causes the unit part to execute a self-test. Moreover, when the unit part receives the unit inspection command for causing the unit part to execute the self-test, the unit part, for example, executes the self-test and outputs a test result as a return value. With this configuration, for example, inspection of the unit parts can be more appropriately performed.

In addition, in this configuration, the printing system may further include various devices in addition to the printing apparatus and the controller. For example, the printing system may further include a peripheral device, which is a device that executes an operation of a pre-process or a post-process with respect to a printing operation performed in the printing apparatus. In this case, as the command group, for example, it is conceivable to use a command group further including a peripheral device control command for controlling the peripheral device. When such command group is used, it is conceivable to control the operation of the peripheral device in accordance with the operation of the printing apparatus by, for example, controlling the operation of the printing apparatus using the printer control command and controlling the operation of the peripheral device using the peripheral control command. With this configuration, for example, various devices included in the printing system can be appropriately controlled using commands included in one command group. Accordingly, for example, the printing system can be managed more easily and appropriately.

More specifically, in this configuration, it is conceivable to use, for example, a textile printer which is an inkjet printer for performing printing on a fabric medium as the printing apparatus. In this case, it is conceivable to use, for example, a pre-coating machine, which is a device for applying a pre-treatment agent to a medium, as a pre-processing machine which is a peripheral device that executes the operation of the pre-process. Furthermore, it is conceivable to use, for example, an apparatus for performing steaming (steaming process) on the medium to which the ink is attached and a process (washing process) for washing the medium as a post-processing machine which is a peripheral device that executes the operation of the post-process.

Furthermore, in the printing system, for example, a plurality of sets of printing apparatuses and peripheral devices may be provided. In this case, the printing system includes, for example, a plurality of printing apparatuses; a plurality of peripheral devices corresponding respectively to a plurality of printing apparatuses; and a controller that controls the plurality of printing apparatuses and the plurality of peripheral devices. Furthermore, for example, the controller controls the plurality of printing apparatuses and the plurality of peripheral devices by, for example, outputting a command included in the command group. According to this configuration, even when the printing system is configured by multiple devices, the control for each device can be appropriately performed using the commands included in one command group.

Furthermore, in this configuration, the printing system may include, for example, a plurality of the printing apparatuses of different models. In this case, it is preferable to use a command that is commonly usable for the plurality of printing apparatuses of different models as at least one of the printer control commands included in the command group. With such a configuration, for example, even when printing apparatuses of various models coexist, the printing system can be more easily and appropriately managed.

Furthermore, as a configuration of the present disclosure, it is conceivable to use a managing method for the printing system having the features similar to the above. In this case as well, for example, effects similar to the above can be obtained.

According to the present disclosure, the printing system can be more appropriately managed.

BRIEF DESCRIPTION OF THE DRAWINGS

FIGS. 1A and 1B are views describing a printing system 10 according to one embodiment of the present disclosure, wherein

DESCRIPTION OF EMBODIMENTS

Figure 1A:
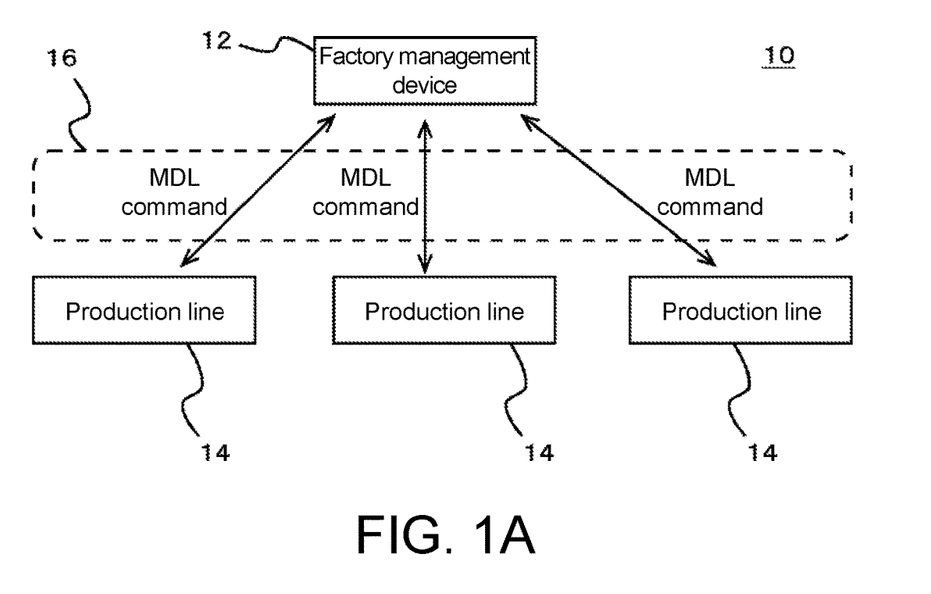
FIG. 1A shows an example of a configuration of the printing system 10.
Figure 1B:
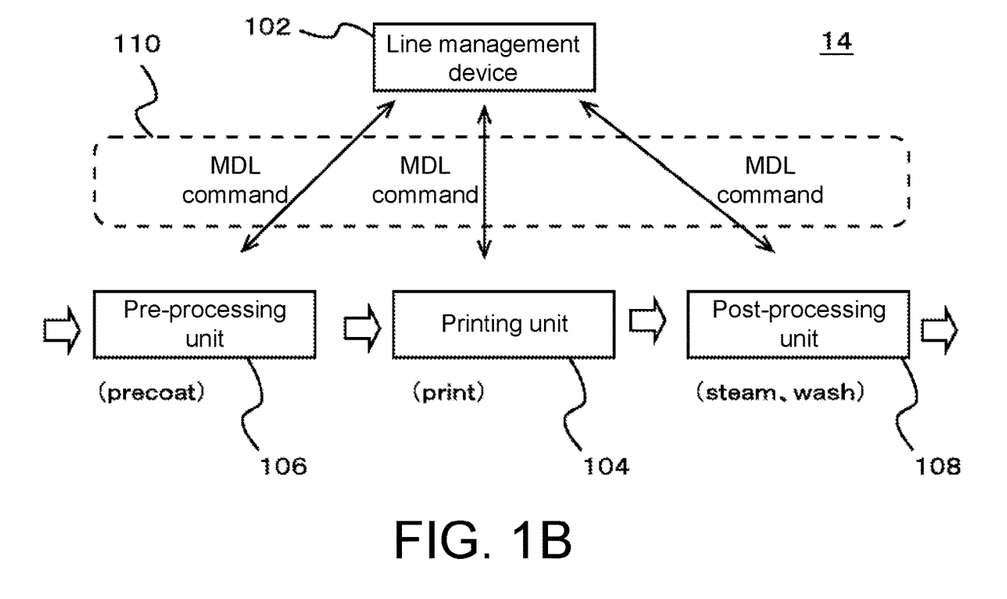
FIG. 1B shows an example of a configuration of a production line 14 that forms a part of the printing system 10.

Hereinafter, an embodiment according to the present disclosure will be described with reference to the drawings. FIGS. 1A and 1B are views describing a printing system 10 according to one embodiment of the present disclosure. FIG. 1A shows an example of a configuration of the printing system 10. FIG. 1B shows an example of a configuration of a production line 14 that forms a part of the printing system 10. Note that, other than the points described below, the printing system 10 and each component of the printing system 10 in the present example may have features same as or similar to a known printing system and each component of the printing system.

In the present example, the printing system 10 is a system that configures at least a part of a factory that manufactures printed products, and includes a factory management device 12 and a plurality of production lines 14. The factory management device 12 and each of the plurality of production lines 14 are connected through an in-plant network 16 which is a communication network built in the printing system 10, as shown in FIG. 1A.

The factory management device 12 is a controller that manages the entire printing system 10, and controls each production line 14 using an MDL command, which is an example of a command (device control command) used to control the apparatus. As the factory management device 12, for example, a computer or the like in which software for managing the printing system 10 is installed can be suitably used. In the present example, the factory management device 12 transmits an MDL command to at least one of the devices in the production line 14 through the in-plant network 16. Furthermore, return values for the MDL commands are received from the devices in the production line 14 as necessary. Thus, the factory management device 12 controls each production line 14 using the MDL command. The MDL command will be described in more detail later. Moreover, the printing system 10 may further include, for example, a device not included in the production line 14, and the like. In this case, it is conceivable to perform the control of such devices by transmitting the MDL command from the factory management device 12.

Each of the plurality of production lines 14 is a part that executes a series of processes for manufacturing a product. Furthermore, in the present example, each production line 14 is a production line for manufacturing a fabric product printed by dyeing a fabric medium by textile printing process, and includes a line management device 102, a printing unit 104, a pre-processing unit 106 and a post-processing unit 108. Each part of the production line 14 is connected through an in-system network 110 which is a communication network built in the production line 14, as shown in FIG. 1B. In this case, the in-system network 110 can also be considered as, for example, a network or the like that forms a part of the in-plant network 16.

The line management device 102 is a controller in each production line 14 and controls each of the devices configuring the production line 14 together with the line management device 102 using an MDL command. As the line management device 102, for example, a computer or the like in which software for managing the production line 14 is installed can be suitably used. In the present example, the line management device 102 transmits the MDL command to each device in the production line 14 through the in-system network 110. Furthermore, return values for the MDL commands are received from each device in the production line 14 as necessary. Thus, the line management device 102 controls each device in the line management device 102 using the MDL command. The line management device 102 may also control each device by, for example, receiving the MDL command from the factory management device 12 and transferring the MDL command to each device. Furthermore, at least a part of the control on the devices in the factory management device 12 may be performed by, for example, transmitting the MDL command directly from the factory management device 12 to each device.

The printing unit 104 is a part having at least a printing apparatus, and executes printing (print) on a fabric medium. In this case, the fabric medium is, for example, various fabric products (e.g., clothes etc.), fabric before processing, and the like. Furthermore, in the present example, for example, a textile printer which is an inkjet printer for performing printing on a fabric medium and the like is used as a printing apparatus in the printing unit 104. The configuration of the printing unit 104 will be described in more detail later.

The pre-processing unit 106 and the post-processing unit 108 are parts including peripheral devices. In this case, the peripheral device is, for example, a device that executes the operation of the process related to the printing operation performed in the printing unit 104. The peripheral device does not necessarily need to be installed near the printing unit 104, and may be installed at a position away from the printing unit 104 as necessary. Furthermore, as a peripheral device, for example, it is conceivable to use a pre-processing machine that executes the operation of the pre-process with respect to the printing operation performed in the printing unit 104, a post-processing machine that executes the operation of the post-process with respect to the printing operation performed in the printing unit 104, and the like.

In the present example, the pre-processing unit 106 is a part including a pre-processing machine, and executes the operation of the pre-process on the medium by the pre-processing machine. Moreover, for example, a pre-coating machine is used as the pre-processing machine. In this case, the pre-coating machine is, for example, a device for applying a pre-treatment agent to the medium before being printed in the printing unit 104. As a pre-treatment agent, various known pre-treatment agents and the like, which are used at the time of printing of the fabric medium can be suitably used. Furthermore, the pre-processing unit 106 may include a pre-processing machine other than the above. Moreover, the pre-processing unit 106 may include a plurality of pre-processing machines.

The post-processing unit 108 is a part including a post-processing machine, and executes the operation of the post-process on the medium by the post-processing machine. As the post-processing machine, for example, a device that performs steaming (steaming process) on a medium to which ink is attached is used. In addition, the post-processing unit 108 may further include, for example, a device that performs a process of washing the medium (washing process) as a post-processing machine. In this case, the post-processing unit 108 can be considered as a part including a plurality of peripheral devices, and the like. Moreover, the post-processing unit 108 may include a post-processing machine other than the above.

Here, as described above, in the present example, the printing system 10 includes a plurality of production lines 14. In this case, the configuration of each production line 14 may be the same or may be different from each other. If the configurations of the plurality of production lines 14 are the same, for example, it is conceivable to manufacture the same product by the plurality of production lines 14, and the like. Furthermore, the manufacturing of products different from each other may be performed using the production lines 14 having the same configuration. Moreover, if the configurations of each of the production lines 14 are different from each other, it may be considered to manufacture different products in the respective production lines 14, or the like.

Furthermore, in FIGS. 1A and 1B, an example of a configuration of the production line 14 is shown for a case where each production line 14 includes the line management device 102. However, in a modified example of the configuration of the printing system 10, the line management device 102 may also be considered, for example, to be commonly used by the factory management device 12. In this case, it is conceivable to control each device of the plurality of production lines 14 with one factory management device 12 instead of installing the individual line management device 102 in each production line 14.

Figure 2:
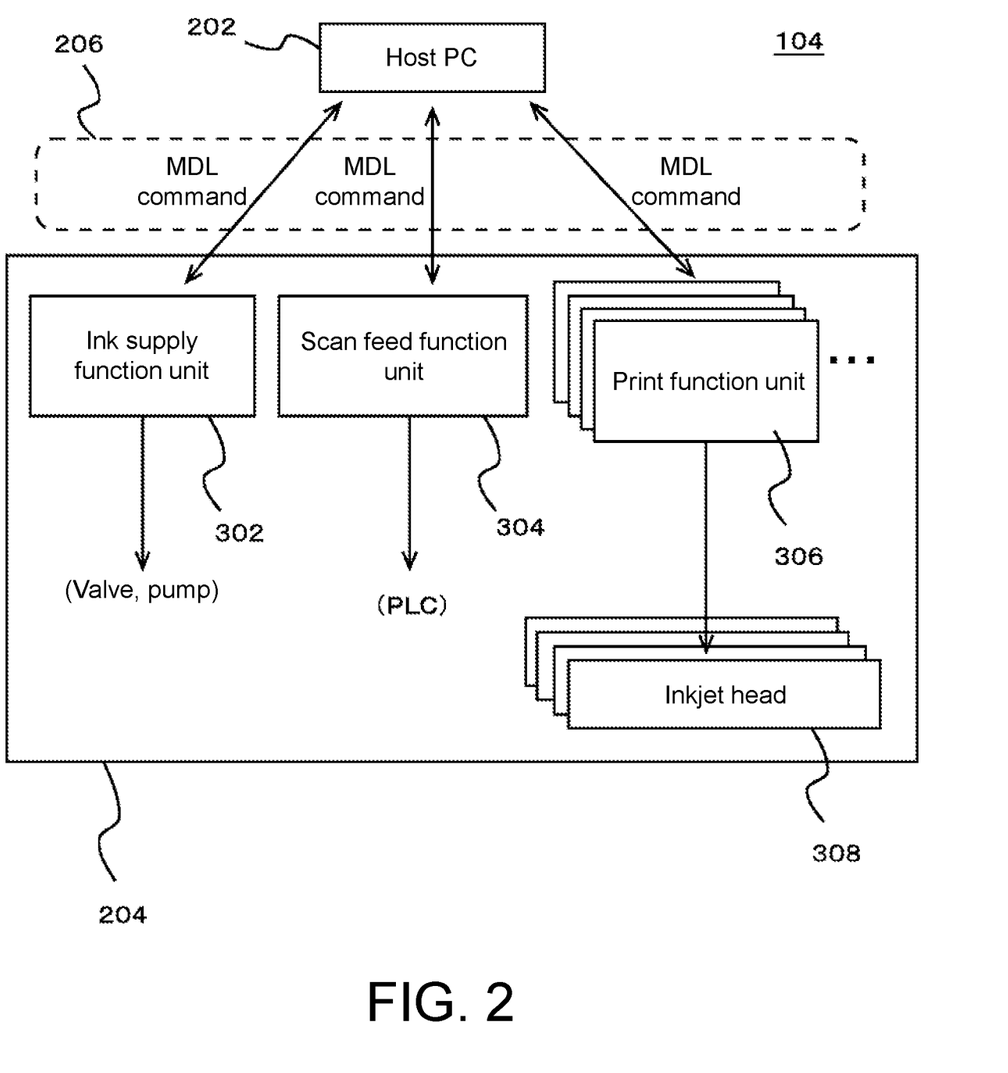
FIG. 2 is a view describing a configuration of a printing unit 104 in more detail.

Subsequently, a configuration of the printing unit 104 used in the present example will be described in more detail. FIG. 2 is a view describing the configuration of the printing unit 104 in more detail, and shows an example of a configuration of a part of the printing unit 104 focusing on the function for realizing the function of the printing unit 104. In the present example, the printing unit 104 includes a host PC 202 and a body 204. The host PC 202 and the body 204 are connected through an in-system network 206 as shown in FIG. 2. In this case, the in-system network 206 can also be considered as, for example, a network that forms a part of the in-plant network 16 or the in-system network 110 (see FIGS. 1A and 1B).

The host PC 202 is a controller that controls the body 204, and controls the body 204, which is a device that configures the printing unit 104 together with the host PC 202, using an MDL command. As the host PC 202, for example, a computer or the like in which software for managing the body 204 is installed can be suitably used. As such software, for example, software for providing a user interface (UI) for accepting user's instruction, software for causing the body 204 to execute printing and maintenance operations, and the like may be used. Furthermore, in the present example, the host PC 202 transmits the MDL command to the body 204 through the in-system network 206. Furthermore, return values for the MDL commands are received from the body 204 as necessary. Thus, the host PC 202 controls the body 204 using the MDL command.

In the present example, the host PC 202 can also be considered as an example of a control master unit having a configuration of controlling the operation of each part of the body 204. Furthermore, the function of a part of the host PC 202 may be executed by, for example, a control unit provided in the body 204. In this case, for example, at least a part of the operation of controlling a unit part in the body 204 using an MDL command as described below may be executed by a control unit or the like provided in the body 204. In this case, the control unit and the like provided in the body 204 can also be considered as an example of a control master unit. Moreover, the host PC 202 may control the body 204 by, for example, receiving the MDL command from the line management device 102 or the factory management device 12 (see FIGS. 1A and 1B) and transferring the MDL command to the body 204. In addition, at least a part of the control on the body 204 may be performed by, for example, transmitting the MDL command directly from the line management device 102 or the factory management device 12 to the body 204.

The body 204 is a body part that executes the printing operation in the printing unit 104. More specifically, in the present example, the body 204 is a printing apparatus that executes the printing operation according to the control of the host PC 202, and includes an ink supply function unit 302, a scan feed function unit 304, a plurality of print function units 306, and a plurality of inkjet heads 308 and the like. Furthermore, more specifically, the body 204 further includes various configurations necessary for the printing operation and the like, as exemplified in FIG. 2 as a valve, a pump, a PLC and the like, for example, in addition to the configurations denoted with reference numerals. As these configurations, for example, it is conceivable to use configurations same as or similar to the known inkjet printers.

Among these configurations, the ink supply function unit 302, the scan feed function unit 304, and the print function unit 306 are examples of unit parts. In this case, the unit part is, for example, a replaceable function component. The unit part can also be considered as, for example, a module (printer module) or the like that configures a part of the body 204. Furthermore, in this case, the body 204 of the present example can be considered that, for example, at least a part is configured by a unit part. As will be described below, each of the ink supply function unit 302, the scan feed function unit 304, and the print function unit 306 is a unit part having functions different from each other. Thus, at least a part of the body 204 can also be considered as being configured by, for example, a plurality of unit parts having functions different from each other. Moreover, in the present example, it is conceivable to use a component having a processing unit that performs processing based on the MDL command as these unit parts. Furthermore, for example, it is conceivable to use a substrate on which an electronic component is mounted as such a processing unit. Moreover, in the present example, each unit part is connected to the in-system network 206 by, for example, Ethernet (registered trademark) connection. Thus, each unit part is configured to be able to receive and respond to the MDL command from the host PC 202 or the like. The control and the like of the unit part performed using the MDL command will be described in more detail later.

Furthermore, among these unit parts, the ink supply function unit 302 is a unit part for supplying ink to the plurality of inkjet heads 308, and supplies ink to the plurality of inkjet heads 308 by, for example, controlling the operations of a valve, a pump or the like disposed in an ink supply path in the body 204. In this case, for example, it is also conceivable to circulate the ink in a predetermined circulation path by controlling the operation of the valve or the pump by the ink supply function unit 302. Furthermore, in the ink supply function unit 302, for example, it is preferable to further manage the remaining amount of ink. Moreover, in the present example, the ink supply function unit 302 executes the operation described above in response to, for example, an MDL command received from the host PC 202.

Furthermore, the scan feed function unit 304 is a unit part that controls the scanning operation by the plurality of inkjet heads 308. In this case, the scanning operation is, for example, an operation of moving relative to the medium. In the present example, the scan feed function unit 304 causes the plurality of inkjet heads 308 to perform the main scan and the sub scan as the scanning operation. In this case, the main scan is, for example, an operation (scanning operation) of ejecting ink while moving in a main scanning direction set in advance. The sub scan is, for example, an operation of moving in a sub scanning direction orthogonal to the main scanning direction. In the present example, the scan feed function unit 304 performs the drive of the feed operation for conveying the medium in a conveyance direction parallel to the sub scanning direction to cause the plurality of inkjet heads 308 to perform the sub scan. Furthermore, in this case, the scan feed function unit 304 executes the above operation, for example, by controlling the operation of a sequencer (PLC) in response to, for example, the MDL command received from the host PC 202.

The plurality of print function units 306 are unit parts that perform a control to cause the plurality of inkjet heads 308 to eject ink. Each of the plurality of print function units 306 is associated with each of the plurality of inkjet heads 308 and, based on an image to be printed on the medium, causes the corresponding inkjet head 308 to eject ink to each position of the medium. In the present example, each of the plurality of print function units 306 executes the above operation, for example, in response to the MDL command received from the host PC 202.

The plurality of inkjet heads 308 are ejection units that eject the ink used for printing, and attach the ink to the medium by ejecting the ink according to the control of the plurality of print function units 306. In this case, each of the plurality of inkjet heads 308 ejects, for example, inks of different colors. More specifically, for example, it is considered that each of the plurality of inkjet heads 308 ejects ink of each color of yellow (Y), magenta (M), cyan (C), and black (K). With such a configuration, for example, various colors can be appropriately represented through, for example, the subtractive color mixing method. Furthermore, the ink ejected by each of the inkjet heads 308 is not limited to the ink of the above color, and an ink of another color may be used.

According to the present example, the printing unit 104 can appropriately perform printing on the medium. Furthermore, the body 204 of the printing unit 104 can be appropriately configured using a plurality of unit parts. The features associated with using a plurality of unit parts will be described in more detail later.

Here, regarding the configuration of the printing unit 104, the configuration including the host PC 202 and the body 204 has been mainly described above. However, in a modified example of the configuration of the printing unit 104, the printing unit 104 may be configured by one device having a function combining the function of the host PC 202 and the function of the body 204. In this case, the in-system network 206 can be considered as, for example, a network built in the one device. Further, as described above, in FIG. 2, an example of a configuration of a part of the printing unit 104 is shown, focusing on the function for realizing the function of the printing unit 104. However, when the configuration of the printing unit 104 is considered focusing on the printing operation performed by the printing unit 104, the configuration of the printing unit 104 can be shown to be different from FIG. 2.

Figure 3:
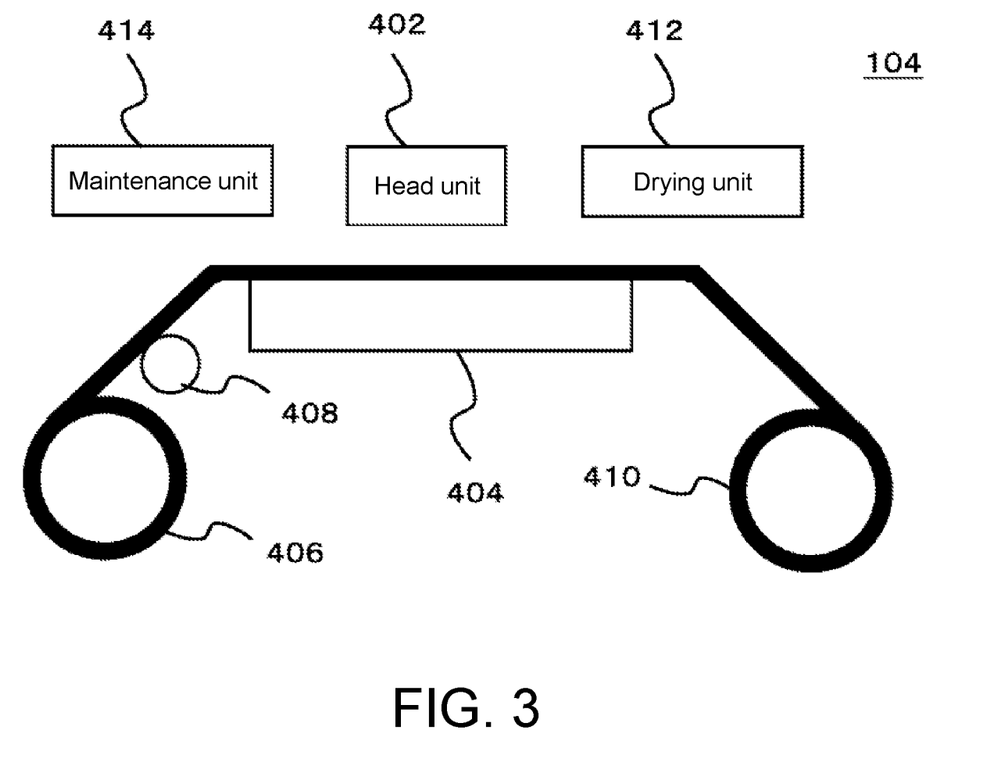
FIG. 3 is a view showing an example of a configuration of a part of the printing unit 104 focusing on the printing operation.

FIG. 3 is a view showing an example of a configuration of a part of the printing unit 104 focusing on the printing operation. The configuration illustrated in FIG. 3 can also be considered as, for example, an example of the configuration of the body 204 in the printing unit 104. As shown in FIG. 3, when the configuration of each part of the printing unit 104 is considered focusing on the printing operation, for example, the printing unit 104 can be considered to include a head unit 402, a platen 404, a feeding unit 406, a tension bar 408, a winding unit 410, a drying unit 412, and a maintenance unit 414.

In this case, the head unit 402 is a part that ejects ink to the medium. The head unit 402 can also be considered as, for example, a part including a plurality of inkjet heads. The platen 404 is a table-shaped member that holds the medium at a position facing the head unit 402. The feeding unit 406 is a part that feeds the medium toward the platen 404. The tension bar 408 is a rod-shaped member that applies a predetermined tension to the medium fed from the feeding unit 406. The winding unit 410 is a part that winds the medium after the ink is ejected by the head unit 402. Furthermore, the drying unit 412 is a part including a heater for drying the ink on the medium. The maintenance unit 414 is a part that performs maintenance of the inkjet head 308. The printing to the medium can be appropriately performed by using the printing unit 104 having each configuration described above.

Here, as described above, FIG. 3 shows an example of a configuration of the printing unit 104 from a viewpoint different from that of FIG. 2. Furthermore, in this case, the printing unit 104 can be considered to include, for example, the host PC 202, the ink supply function unit 302, the scan feed function unit 304, and the print function unit 306 and the like (see FIG. 2) other than the configuration shown in FIG. 3. Other than such configurations, the printing unit 104 may further include configurations same as or similar to the known inkjet printers.

Subsequently, the various features described above will be described in more detail. First, the MDL command will be described in more detail. As described above, in the present example, the MDL command is an example of a device control command. Furthermore, as can be understood from the above description, a control performed using an MDL command is, for example, a control performed using a plurality of commands corresponding to various purposes. Therefore, a control performed using an MDL command can be considered, for example, as an example of a control performed using a command group including a plurality of commands.

Moreover, in this case, the command group can be considered as, for example, a group including a plurality of commands created using a common development environment. The common development environment is, for example, a development environment having the same specification. When referring to having the same specification, this means, for example, that the standard which defines the basic features of the development environment is the same. The development environment having the same specification can also be considered as, for example, a development environment or the like compatible with the created command based on a predetermined specification. More specifically, the command group can be considered as, for example, a group including a plurality of commands created using a software development kit (SDK) based on a same specification. In this case, an SDK based on the same specification is, for example, an SDK that provides a development environment of the same specification. Furthermore, the SDK based on the same specification can be considered as an SDK and the like distributed as having a predetermined compatibility by the same distributor. Also, as described above, in the present example, an MDL command is used as a command that configures a command group. The MDL command can be considered as, for example, a command or the like created using the MDL command SDK distributed by MIMAKI ENGINEERING CO., LTD.

Furthermore, the MDL command can be considered, for example, as a command or the like that allows the printing apparatus corresponding to the MDL command to be controlled by the user's production system or peripheral device. Furthermore, as such MDL command, for example, it is conceivable to use a command for controlling the position and height of the platen holding a medium to be printed, a command for controlling the operation of the printing apparatus such as the start of printing, a command for confirming the remaining amount of ink in the printing apparatus, a command for acquiring error information of the printing apparatus, and the like. The user of the printing apparatus can build, for example, a printing system suitable for various purposes by using such MDL command. In the printing system 10 of the example as well, it is conceivable to use a command group including at least a part of such commands.

Furthermore, as described above, in the present example, the MDL command is used in the control on each configuration configuring the printing system 10, the control of each device in the production line 14, the control of a plurality of unit parts in the printing unit 104, and the like. In this case, for example, the MDL command used to control the printing unit 104 in the production line 14 can also be considered as an example of a printer control command which is a command for controlling the printing apparatus. In this case, using the MDL to control the printing unit 104 means, for example, using an MDL command to control the body 204 of the printing unit 104 which is a printing apparatus. Furthermore, the MDL command used to control the pre-processing unit 106 and the post-processing unit 108 in the production line 14 can be considered, for example, as an example of a peripheral device control command for controlling the peripheral device. Moreover, as will be described in more detail later, in the present example, at least a command used for inspection of a unit part is used as an MDL command used to control a plurality of unit parts in the printing unit 104. In this case, such an MDL command can be considered as an example of a unit inspection command.

In this case, the command group used in the present example can be considered as, for example, a command group including a printer control command, a peripheral device control command, and a unit inspection command. Furthermore, in this case, for example, the operation of controlling the printing unit 104, the pre-processing unit 106, and the post-processing unit 108 using the MDL command in the production line 14 can be considered, for example, as the operation of controlling the operation of the peripheral device in accordance with the operation of the printing apparatus by controlling the operation of the printing apparatus using the printer control command and controlling the operation of the peripheral device using the peripheral device control command.

Subsequently, the control of a unit part performed using the MDL command, and the like will be described in more detail. As described above, in the present example, control is performed using the MDL command on a plurality of unit parts having various functions. Thus, each unit part is caused to execute an operation corresponding to the function. Furthermore, as described above, in the present example, at least a command used to inspect a unit part is used as an MDL command used to control a plurality of unit parts in the printing unit 104.

Therefore, each of the plurality of unit parts (e.g., ink supply function unit 302, scan feed function unit 304, print function unit 306, etc. shown in FIG. 2) used in the present example is configured to be inspected using an MDL corresponding to a unit inspection command. More specifically, in this case, for example, it is conceivable to use the unit part with a component and the like that is configured to execute a self-test. The self-test is, for example, an inspection in which confirmation of the state of the unit part is confirmed by the unit part itself. Furthermore, in this case, for example, it is conceivable to use a command for causing a unit part to execute a self-test as an MDL command corresponding to a unit inspection command. In such a configuration, a unit part that has received an MDL command for executing a self-test, for example, performs the self-test and outputs a test result as a return value. With such a configuration, for example, an inspection of the unit part can be performed appropriately.

Furthermore, when the printing unit 104 is configured using a plurality of unit parts as in the present example, it is conceivable to incorporate the plurality of unit parts into the body 204 of the printing unit 104 after performing the inspection of the unit part. More specifically, in this case, for example, the plurality of unit parts are subjected to inspection (pre-inspection) using the unit inspection command before being incorporated into the body 204. According to this configuration, for example, the printing unit 104 can be more appropriately configured using the unit part. Moreover, for example, it is conceivable to perform such pre-inspection by outputting the MDL command corresponding to the unit inspection command from the controller for inspection to the unit part. According to such a configuration, the inspection of the unit part can be appropriately performed. Furthermore, in this case, as a controller for inspection, for example, a device different from the host PC 202 and the body 204 in the printing unit 104 may be used. Moreover, in the pre-inspection, for example, the host PC 202, the body 204 and the like in the printing unit 104 may be used as a controller for inspection to inspect the unit part.

Here, for example, in a conventional configuration, an inspection unit had to be prepared individually for each unit part in a case where a printing apparatus in a printing unit is to be configured using a plurality of unit parts. More specifically, in this case, development and the like of firmware for responding to the inspection had to be performed individually for each unit part, and the man hours required for the development may be greatly increased. On the other hand, in the present example, by inspecting a unit part using an MDL command as described above, for example, the inspection can be efficiently performed through a general method with high commonality even in a case where a plurality of types of unit parts are used. Moreover, for example, even in a case where a plurality of unit parts are used, an increase in the man hours required for development can be appropriately suppressed. Furthermore, in this case, for example, the inspection results for each unit part can be managed more easily and appropriately by performing inspection through a method with high commonality. Therefore, according to the present example, for example, even when the printing system 10 includes a printing apparatus manufactured using a plurality of unit parts having different functions, the printing system 10 can be managed more easily and appropriately.

It is conceivable that, for example, the host PC 202 of the printing unit 104 manages the results of the inspection for a plurality of unit parts. Furthermore, it is conceivable to store at least a part of the inspection result in, for example, a storage provided in the body 204. In this case, it is also conceivable to adjust the operation of the body 204 based on the inspection result stored in the storage. As such a storage, it is conceivable to use, for example, a known memory device, PLC, and the like. Furthermore, it is also conceivable to manage at least a part of the inspection result by, for example, the line management device 102 in the production line 14 or the factory management device 12 (see FIGS. 1A and 1B) in the printing system 10.

Subsequently, supplementary explanation will be given on the control of the production line 14 performed using the MDL command, the configuration of the printing system 10, and the like. As described above, in the production line 14 of the present example, the control of the printing unit 104, the pre-processing unit 106, and the post-processing unit 108 is performed using the MDL command. For such control, for example, it can be considered that control using commands included in one command group is being performed on various devices included in the production line 14. When configured in this manner, control can be efficiently performed on a plurality of devices through a method for high commonality. Thus, for example, the production line 14 and the printing system 10 can be performed more easily and appropriately.

More specifically, in the present example, in the production line 14, for example, the printing unit 104 including a device for performing textile printing process, and the pre-processing unit 106 and the post-processing unit 108 including a device for performing a process before and after the textile printing are used to dye the fabric medium by the textile printing process. In this case, by controlling each device by the MDL command, the operations of a plurality of devices can be more appropriately cooperated. Therefore, according to the present example, for example, control and management of the production operation in the production line 14 can be more appropriately performed. In this case, it is also conceivable to perform inspection on each device using an MDL command. According to this configuration, for example, inspection of various devices configuring the production line 14 can be more easily and appropriately performed. Furthermore, in this case, in addition to the inspection of unit parts that configure a part of one device, it is considered that by using the MDL command even for the control of the operation of the entire device, so to speak, control having high commonality among controls having different hierarchies is realized. Therefore, in the present example, also in this respect, the production line 14 and the printing system 10 can be managed more easily and appropriately.

Here, as described above, in the present example, the printing system 10 includes a plurality of production lines 14. The configurations of each of the production lines 14 may be different from one another. More specifically, in this case, it is conceivable to use as a printing apparatus used in some production lines 14, an apparatus of a model different from the printing apparatus used in any of the other production lines 14. In this case, the printing system 10 can be considered as, for example, a system including a plurality of printing apparatuses of different models. In this case, it is preferable to use a command that is commonly usable for a plurality of printing apparatuses of different models as at least a part of the MDL command used as a printer control command. With such a configuration, for example, even when printing apparatuses of various models coexist, the printing system 10 can be more easily and appropriately managed.

In this case, it is also conceivable to use apparatuses respectively including a plurality of unit parts as a plurality of printing apparatuses of different models. In this case, it is preferable to use a component that is configured to be inspected using the MDL command for each unit part included in each printing apparatus. According to this configuration, for example, the inspection can be more easily and appropriately performed on each part configuring each printing apparatus. Accordingly, for example, the printing system 10 can be managed more easily and appropriately.

When the printing system 10 includes a plurality of production lines 14 as in this example, the printing system 10 can be considered as, for example, a system including a plurality of sets of printing apparatuses and peripheral devices. Furthermore, in this case, the factory management device 12 in the printing system 10 can be considered as, for example, a controller that controls a plurality of printing apparatuses and a plurality of peripheral devices.

Moreover, as described above, in the present example, the control of the entire printing system 10 is also performed using the MDL command. In this case, the operation of controlling the plurality of production lines 14 by the factory management device 12 can also be considered as, for example, an operation of controlling a plurality of printing apparatuses and a plurality of peripheral devices using an MDL command. With such a configuration, even when the printing system 10 is configured by multiple devices, control on each device can be appropriately performed using a method having high commonality. Furthermore, in this case, by using the MDL command even in the control of the entire printing system 10 in addition to the inspection of unit parts configuring a part of one device and the control of the operation in units of devices, control of high commonality can be realized in the control of various hierarchies in the printing system 10. Therefore, in the present example, the printing system 10 can be managed more easily and appropriately in this regard as well.

Moreover, regarding the control in each hierarchy in the configuration described above, the controller is provided in each hierarchy as a controller that outputs the MDL command. In this case, the controller is, for example, a device that controls another device by outputting at least one of the commands included in the command group. More specifically, in the present example, the factory management device 12 is used in the control on the entire printing system 10. Furthermore, the line management device 102 is used in the control in the production line 14. The host PC 202 is used in the control in the printing unit 104. Furthermore, as the controller, for example, a device combining a plurality of computers and the like may be used. Moreover, in this case, for example, at least a part of a configuration combining the factory management device 12, the line management device 102, and the host PC 202 can be considered as a controller of the printing system 10.

Furthermore, in a modified example of the configuration of the printing system 10, control may be performed in a plurality of hierarchies by one controller. More specifically, in this case, functions of a plurality of devices of at least one of the factory management device 12, the line management device 102, and the host PC 202 may be provided to one controller. Furthermore, in the printing unit 104, for example, the body 204 having a configuration corresponding to the printing apparatus may also have the function of the host PC 202.

The configuration of each part of the printing system 10 is not limited to the configuration described above, and various changes may be made. For example, in the description made above, a case where an inkjet printer is used has been mainly described for the printing apparatus used in the printing system 10. In this case, the inkjet printer is, for example, a printing apparatus that prints a two-dimensional image through an inkjet method. However, in a modified example of the configuration of the printing system 10, it is conceivable to use a printing apparatus other than the inkjet printer. In addition, as the printing apparatus, for example, it is also conceivable to use a 3D printer that performs shaping of a three-dimensional shaped object.

INDUSTRIAL APPLICABILITY

The present disclosure can be suitably used, for example, in a printing system.

What is claimed is:

1. A printing system that performs printing, the printing system comprising:
    a plurality of production lines, configured for manufacturing a fabric product printed by dyeing a fabric medium by a textile printing process; and
    a factory management device configured to control the plurality of production lines;
    wherein each of the plurality of production lines comprises:
        a line management device disposed in each of the plurality of production lines;
        a printing apparatus in which at least a part thereof is configured by a unit part which is a replaceable function component;
        a pre-processing machine configured to execute a pre-process with respect to a printing operation performed in the printing apparatus; and
        a post-processing machine configured to execute a post-process with respect to the printing operation performed in the printing apparatus,
        wherein the pre-processing machine is configured to apply a pre-treatment agent to the fabric medium before being printed in the printing apparatus, and
        the post-processing machine is configured to perform steaming on the fabric medium to which an ink is attached,
    wherein
    at least a part of the printing apparatus is configured by a plurality of the unit parts having different functions,
    the printing apparatus is controlled using a command group including a printer control command which is a command for controlling the printing apparatus, a peripheral device control command which is a command for controlling the pre-processing machine and the post-processing machine, and a unit inspection command which is a command used for an inspection of the unit part,
    the factory management device is configured to send commands included in the command group to at least one of the line management device, the printing apparatus, the pre-processing machine and the post-processing machine in the production line to control the production line, in the production line, the line management device is configured to control an operation of the printing apparatus by using the printer control command, and control operations of the pre-processing machine and the post-processing machine by using the peripheral device control command, so that the operations of the pre-processing machine and the post-processing machine are controlled in accordance with the operation of the printing apparatus, and the plurality of unit parts is configured to be inspected using the unit inspection command.

2. The printing system according to claim 1, wherein each of the plurality of unit parts is inspected using the unit inspection command before being incorporated into the printing apparatus.

3. The printing system according to claim 1, wherein the command group is a group including a plurality of commands created using a software development kit based on a same specification.

4. The printing system according to claim 1, wherein the factory management device is configured to control another device by outputting at least one of the commands included in the command group, wherein, when the inspection on the unit part is to be performed, the factory management device outputs the unit inspection command to the unit part.

5. The printing system according to claim 1, wherein the unit part is a component that is configured to execute a self-test, the command group includes the unit inspection command that causes the unit part to execute the self-test, and when the unit part receives the unit inspection command for causing the unit part to execute the self-test, the unit part executes the self-test and outputs a test result as a return value.

6. The printing system according to claim 1, further comprising:

a plurality of the printing apparatuses;

a plurality of the pre-processing machines corresponding respectively to the plurality of the printing apparatuses;

a plurality of the post-processing machines corresponding respectively to the plurality of the printing apparatuses; and the factory management device that controls the plurality of the printing apparatuses, the plurality of the pre-processing machines, and the plurality of the post-processing machines, wherein the the factory management device controls the plurality of the printing apparatuses, the plurality of the pre-processing machines and, the plurality of the post-processing machines by outputting a command included in the command group.

7. The printing system according to claim 1, further comprising:

a plurality of the printing apparatuses of different models, wherein the command group includes, as at least one of the printer control commands, a command commonly usable for the plurality of printing apparatuses of different models.

8. A managing method for the printing system according to claim 1 that performs printing, wherein the managing method comprises:

controlling the printing apparatus using the command group including the printer control command which is the command for controlling the printing apparatus, the peripheral device control command which is the command for controlling the pre-processing machine and the post-processing machine, and the unit inspection command which is the command used for the inspection of the unit part, wherein at least the part of the printing apparatus is configured by the plurality of the unit parts having different functions, and the plurality of unit parts is configured to be inspected using the unit inspection command.

* * * * *